Figure 1:
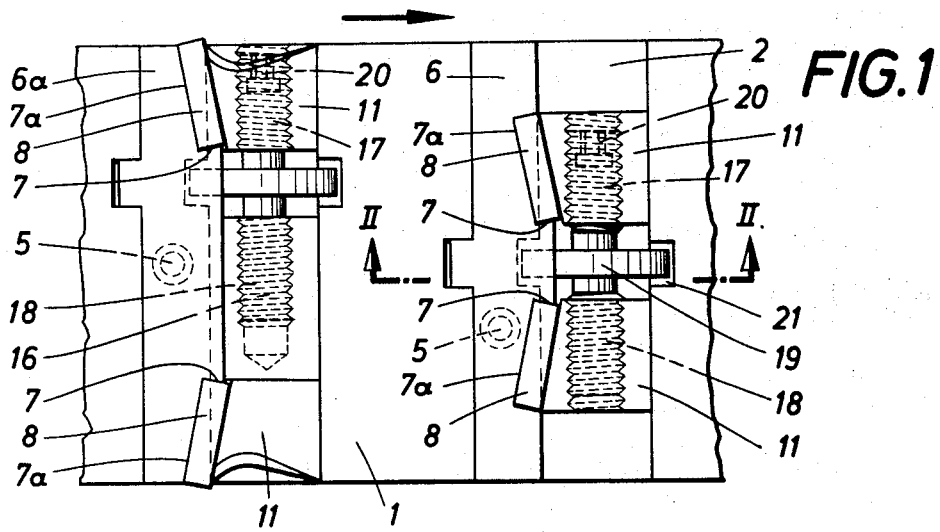

United States Patent [19]
Pristavnik

[11] 3,837,059
[45] Sept. 24, 1974

[54] PROFILE MILLING CUTTER

[75] Inventor: Rudolf Pristavnik, Steyr, Austria

[73] Assignee: GFM Gesellschaft fur Fertigungstecknik und Maschinenbau Aktiengesellschaft, Steyr, Austria

[22] Filed: Dec. 28, 1973

[21] Appl. No.: 429,688

[30] Foreign Application Priority Data
Jan. 5, 1973 Austria................................ 113/73

[52] U.S. Cl...................................... 29/105 R
[51] Int. Cl..................................... B26d 1/12
[58] Field of Search................................. 29/105 R

[56] References Cited
UNITED STATES PATENTS
| | | | |
|---|---|---|---|
| 1,527,650 | 2/1925 | Hunt............................ | 29/105 R X |
| 2,499,994 | 3/1950 | Hart................................ | 29/105 R |
| 3,200,474 | 8/1965 | Kralowetz....................... | 29/105 R |

Primary Examiner—Leonidas Vlachos
Attorney, Agent, or Firm—Kurt Kelman

[57] ABSTRACT

This invention relates to a profile milling cutter for cylindrical milling of crankpins or the like, consisting of a cutter body and a plurality of cermet cutter plates, which are arranged in pairs in respective peripherally open recesses formed in the cutter body and extending from one end thereof to the other and which are mounted on common support blocks, which determine the radial depth to which the cutter plates are inserted and bear on holders which form two bearing surfaces each, each pair of cutter plates being held in position by a pair of clamping wedges, each recess in the cutter body being prismatic and serving additionally as a guide for the clamping wedges associated with the pair of cutter plates, and a tightening screw, which is parallel to the axis of the cutter body and operate to tighten the clamping wedges.

1 Claim, 3 Drawing Figures

PATENTED SEP 24 1974 3,837,059

3,837,059

PROFILE MILLING CUTTER

The profile milling cutter serves for cylindrical milling. A cutter body has opposite end faces and a plurality of peripherally open, prismatic rescesses extending from one of said end faces to the other. Each of said recesses has a transversely enlarged intermediate portion and is defined in part by a radially outwardly facing step surface which is radially inwardly spaced from the periphery of said cutter body. A plurality of support blocks are mounted on respective ones of said step surfaces. A plurality of holders are provided, which have two bearing surfaces each. A pair of said holders are mounted in each of said recesses. A pair of cutter plates are mounted in each of said recesses and radially inwardly supported by said support block therein. Each of said cutter plates is associated with one of said holders and bears on said two bearing surfaces thereof. A pair of clamping wedges are disposed in each of said recesses on opposite sides of said pair of cutter plates therein. Said clamping wedges of each of said pairs have oppositely handed, axially aligned tapped bores. A plurality of tightening screws extend into respective ones of said recesses. Each tightening screw has mutually opposite shank end portions having oppositely handed screw threads in threaded engagement with respective ones of said clamping wedges in the associated recess, and a collar disposed between said shank end portions and extending with limited axial play into said enlarged portion of the associated recess. Each of said screws is rotatable to move the associated clamping wedges into and out of a clamping position in which they clamp the associated pair of cutter plates between them. Each of said recesses is adapted to guide said clamping wedges therein into and out of said clamping position.

Profile milling cutters of this type have proved most satisfactory and meet to fullest satisfaction the requirements to be fulfilled by them as regards simplicity of manufacture, protection of the tightening screws from being soiled, and provision of a chip chute which is not interrupted by a bore. The only disadvantage of these profile milling cutters resides in that it is relatively complicated and time-consuming to release the tightened clamping wedges because when the tightening screws have been unscrewed each wedge must be pressed or knocked out of its clamping engagement with slight or strong force. Because the clamping wedges must be loosened whenever the cutter plates are to be inverted, rotated, or replaced, a change of cutting edges in such profile milling cutters involves highly uneconomical manipulations. It is known to fix clamping wedges by means of fixing screws which have screw thread sections having different directions. These screws are approximately radially screwed into the cutter body and engage a clamping wedge and the cutter body with respective screw thread sections having different directions so that the clamping wedge will be automatically loosened as the fixing screws are unscrewed. In the other hand, that embodiment has the disadvantage that a separate fixing screw must be provided for each clamping wedge and for this reason involves all drawbacks which are desired to be avoided or eliminated by the use of a profile milling cutter of the kind defined first hereinbefore.

It is also known to use tightening screws which have screw thread sections of opposite hand and are in engagement with mating female screw thread sections of two clamping wedges and can be rotated to move said clamping wedges apart from and toward each other so as to clamp or release the cutter plates. In that arrangement, however, a tightening screw and even two clamping wedges are associated with each cutter plate. This involves an undesired additional expenditure. Besides, the tightening screws are also accessible from the periphery of the cutter body so that the fixing means are liable to be sold and the chip chute is interrupted.

For this reason it is an object of the invention to provide a profile milling cutter of the kind defined first hereinbefore, in which only one clamping wedge is associated with each cutter plate and only one tightening screw which is parallel to the axis of the cutter head is provided for each pair of cutter plates, with improved means for tightening the clamping wedges so that the unscrewing of a tightening screw forces both clamping wedges associated with said screw out of their clamping position and thus loosens said wedges.

This object is essentially accomplished according to the invention by the provision of tightening screws which are provided each at opposite ends with oppositely handed screw thread sections, in known manner, in engagement with mating tapped bores in the two clamping wedges associated with each screw, and between the two screw thread sections with a collar, which extends with limited axial play into a transversely enlarged portion of the recess in the cutter body. Because the two screw sections have screw threads which differ in direction, a rotation of the tightening screw results in oppositely directed movements of the longitudinally guided clamping wedges relative to the shank of the screw. When the clamping wedges have been tightened and the tightening screw is then rotated in the unscrewing sense, one of the two clamping wedges must necessarily be loosened from its clamping position because the screw bears on the other wedge, which is still locked. As the rotation of the tightening screw is continued, one wedge is loosened further and moved from its clamping position and the other wedge remains fixed and the tightening screw is screwed out of the latter wedge. For this reason, the tightening screw moves in an axial direction until the collar engages the side face of enlarged portion of the recess. To ensure that a continued rotation of the screw will result in an axial displacement of the wedge or of the screw itself, the clamping wedge which was fixed so far is now forced out of its clamping position so that the two clamping wedges have now been loosened. Depending on the duration of the rotation of the tightening screw, both clamping wedges now travel outwardly on the respective screwthreaded portions of the tightening screws and fully release the cutter plates. Clamping is effected as follows: As the tightening screw is rotated in a tightening sense, the distance between the two wedges is reduced until one wedge engages one cutter plate. The tightening screw and the other clamping wedge then travel in one direction until the second wedge is in engagement and can be tightened. Hence, where the tightening screens according to the invention are provided, a simple unscrewing and tightening of a screw is sufficient to loosen both clamping wedges associated with a pair of cutter plates jointly from their clamping position or to move them into their clamping position.

An embodiment of the invention is shown by way of example on the accompanying drawing, in which FIG. 1 is a top plan view showing a profile milling cutter for a cylindrical milling of crankpins, the view being taken on a development of the periphery of the cutter in the plane of the drawing.

Figure 2:
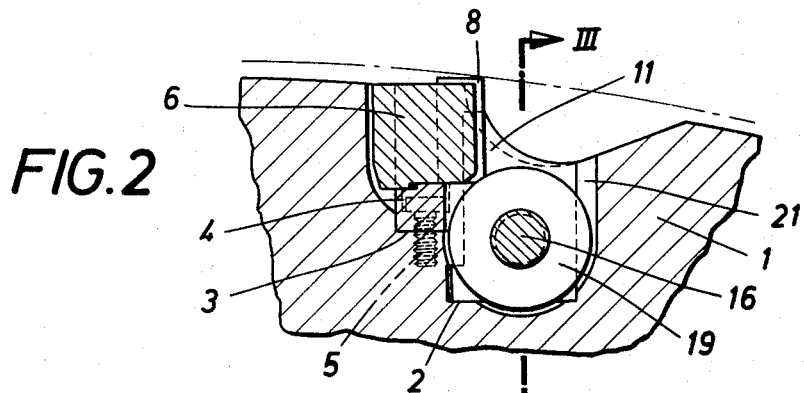

FIG. 2 is a sectional view taken on line II—II in FIG. 1, and

Figure 3:
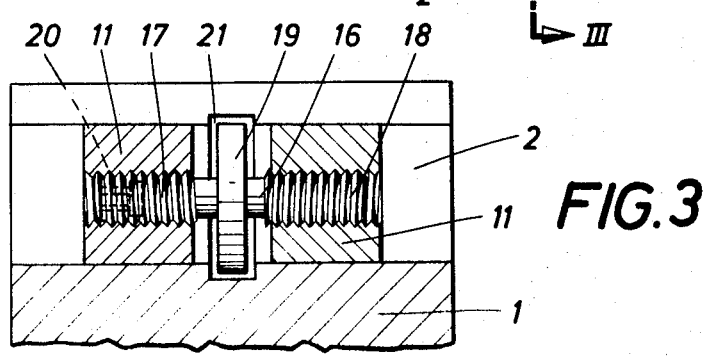

FIG. 3 a sectional view taken on line III—III in FIG. 2.

A cutter body 1 of a profile milling cutter has peripherally open, prismatic recesses 2, which extend from one end face of the cutter body to the other. Support blocks 4 are mounted on steps 3 in respective ones of these recesses and are connected by respective screws 5 to the cutter body 1. Holders 6, 6a are mounted on each of these support blocks 4 and for each of the cutter plates 8 having a basically square configuration provide a lateral bearing surface 7 and a bearing surface 7a for that surface of the cutter which is the trailing surface with respect to the direction of rotation, which is indicated by an arrow. To fix the cutter plates 8 and also the holders 6, 6a, clamping wedges 11 are provided, which are guided in the recesses 2 and act on respective cutter plates 8 and are tightened by a tightening screw 16, which is parallel to the axis of the cutter body. The tightening screw 16 has separate screw-threaded portions 17, 18 in engagement with mating female threads of respective clamping wedges. These two screw-threaded portions have right-hand and left-hand screw threads, respectively. The tightening screw 16 has also approximately in the middle of its shank length a collar 19 between the two screw-threaded portions 17, 18. A hexagonal socket head 20 is provided to rotate the tightening screw so that the tightening screw can easily be tightened sufficiently with a socket screw key. The collar 19 of the tightening screw extends with limited axial play into a transversely enlarged portion 21 of the recess 2 of the outer body.

When the tightening screw 16 is unscrewed, the two oppositely handed screw-threaded portions 17, 18 screwed into the clamping wedges 11 and the collar 19, which extends into the enlarged portion 21 to permit of a limited axial movement of the tightening screw, ensure that the two tightened wedges are removed from their clamping position and release the cutter plates in response merely to the rotation of the tightening screw.

It will be understood that a rotation of the tightening screw in the opposite direction will retighten the clamping wedges.

What is claimed is:

1. A profile milling cutter for cylindrical milling, which comprises a cutter body having opposite end faces and a plurality of peripherally open, prismatic recesses extending from one of said end faces to the other, each of said recesses having a transversely enlarged intermediate portion and being defined in part by a radially outwardly facing step surface which is radially inwardly spaced from the periphery of said cutter body, a plurality of support blocks mounted on respective ones of said step surfaces, a plurality of holders which have two bearing surfaces each and a pair of which are mounted in each of said recesses, a plurality of cutter plates, a pair of which are mounted in each of said recesses and radially inwardly supported by said support block therein, each of said cutter plates being associated with one of said holders end bearing on said two bearing surfaces thereof, a plurality of clamping wedges, a pair of which are disposed in each of said recesses on opposite sides of said pair of cutter plates therein, said clamping wedges of each of said pairs having oppositely handed, axially aligned tapped bores, and a plurality of tightening screws, which extend in respective ones of said recesses and each of which has mutually opposite shank end portions having oppositely handed screw threads in threaded engagement with respective ones of said bores of said clamping wedges in the associated recess, and a collar disposed between said shank end portions and extending with limited axial play into said enlarged portion of the associated recess, each of said screws being rotatable to move the associated clamping wedges into and out of a clamping position in which they clamp the associated pair of cutter plates between them, each of said recesses being adapted to guide said clamping wedges therein into and out of said clamping position.

* * * * *